United States Patent Office 2,892,004
Patented June 23, 1959

2,892,004
PROCESS FOR THE ISOMERIZATION OF NON-VULCANIZED RUBBER

Herbert Bartl and Wilhelm Becker, Koln-Stammheim, Germany, assignors to Farbenfabriken Bayer Aktiengesellschaft, Leverkusen, Germany, a corporation of Germany No Drawing. Application March 16, 1954
Serial No. 416,714

Claims priority, application Germany March 19, 1953

4 Claims. (Cl. 260—770)

This invention relates to rubber derivatives, and more particularly to rubber conversion products formed by the action on rubber of isomerizing agents. The invention more especially relates to improvements in the preparation of derivatives of rubber formed by the action on rubber of isomerizing agents such as halides of certain non-metallic elements, for instance boron fluorides or addition compounds thereof, in the presence of solvents.

Due to the physical and chemical properties the so-called isomerization products of rubber are used in the manufacture of lacquers and varnishes and as painting or coating material. Rubber isomers are obtained by treating rubber with isomerizing agents such as strong acids, for instance sulfuric acid, hydrochloric acid and the like, as well as the so-called Friedel Crafts catalysts, for instance boron halides and complex compounds thereof, tin tetrachloride, aluminum chloride or titanium tetrachloride. Apart from the processes in which isomerizing agents are incorporated in rubber with the aid of machines, for instance rollers, or in which the rubber is isomerized in the presence of non-solvents, such as phenols or naphthols, at high temperature (180–200° C.) isomerization of rubber can be accomplished by adding the isomerizing agents to the final rubber solutions at suitable temperatures. Because of the high viscosity of rubber employed as starting material the isomerization of rubber can be carried out in these cases only at relatively low concentrations on or after depolymerizing the rubber which, however, reduces the economy of the process. The isomerization of rubber in the absence of solvents by means of rollers or kneaders involves high expenses for equipments and allows only small throughputs. Moreover, the quality of the rubber derivatives thus obtained is often unsatisfactory.

In accordance with the invention it has been found that highly concentrated solutions of isomerized rubber can be obtained in a technically simple method by dissolving and isomerizing the rubber at the same time. According to one embodiment of the invention the isomerizing agent and solid, undissolved rubber are added to the solvent simultaneously. At a sufficiently high temperature, isomerization and dissolution of the rubber take place within a surprisingly short time in a strongly exothermic reaction to give a low viscous solution. The efficiency of the process of the invention is so high that one part by weight of non-masticated rubber may be employed per one part by weight of solvent. For example, one may employ the rubber in a quantity of 0.30 to 1.0 part per part of solvent. Since undissolved rubber is employed as starting material the isomerizing agent is always present in a large excess over the dissolved non-cyclicized rubber. It was surprising to find that the isomerization reaction proceeds at a rate higher than that of the dissolution of the rubber. This prevents the intermediate formation of highly viscous solutions and ensures the completion of the entire dissolution and isomerization process within a surprisingly short time.

Suitable starting materials according to the invention are all kinds of raw rubber, such as pale crepe and smoked sheets, furthermore masticated rubber or rubber pretreated by any conventional method. As solvents may be employed practically all the known rubber solvents, for instance aliphatic and aromatic hydrocarbons and chlorohydrocarbons. Suitable isomerizing agents are the usual cyclicising or isomerizing agents. Particularly suitable for this purpose are the Friedel Crafts catalysts. Typical examples of Friedel Crafts catalysts useful to the invention are sulfuric acid, titanium tetrachloride, boron fluoride and addition compounds thereof. The amount of the cyclicizing or isomerizing agents depends upon the properties required. In general, quantities up to 15% suffice to bring about the desired effect. Temperatures within the range of 90–140° C. have proved to be suitable to ensure satisfactory reaction velocities. In order to impart to the conversion products specific properties as to the solubility and compatibility for instance with linseed oil, alkyd resins or stand oils, it has been found to be advantageous to dissolve and isomerize the rubber in the presence of phenols. For this purpose, phenol, cresols, xylenols or naphthols may be used. In the prior art methods using phenols, phenol is generally used in a large excess calculated on rubber. According to the invention quantities up to 20% suffice to bring about the desired effects. The same results are obtained with complex compounds of boron fluoride and phenol.

Apart from the advantages of the new process which makes it possible to prepare highly concentrated solutions of isomerization products from non-pretreated rubber in a technically simple manner, the rubber isomers obtained in accordance with the invention possess valuable properties making them useful for a wide field of application. As compared with the products prepared from rubber solutions the isomers obtained according to the invention have a lower viscosity which is of importance in the large scale manufacture of lacquer or varnish solutions. Moreover, the rubber derivatives obtained according to the invention exhibit extraordinarily good film-forming properties and an excellent stability to acids and alkalies. They are further distinguished by good adhesion to glass, porcelain, paper and metal, which properties render the isomers excellently suitable as adhesives. Another field of application is the printing process. The mechanical properties of natural rubber can be substantially improved by incorporating therewith the rubber isomers obtained according to the invention.

In addition to being useful base materials for coatings and varnishes or lacquers, the solutions or products obtained by the herein described process may be employed in a wide variety of other chemical reactions, for instance in chlorination processes.

The preparation of the rubber isomers according to the invention is illustrated by the following examples, which do not limit the invention; the parts given are by weight if not otherwise stated.

Example 1

150 parts of xylene and 10 parts of boron fluoride acetic acid are heated to 110° C. in a reaction vessel equipped with a mechanical stirrer. 100 parts of crepe rubber are added and the temperature is raised to 130° C. After a few minutes the rubber is dissolved and isomerized to more than 90%. After about 30 minutes the solution is homogeneous and mobile. The solution is precipitated by a mixture of acetone and alcohol and dried. The isomerization product obtained is a light colored resinous substance which dissolves in gasoline to give a mobile solution.

Example 2

150 parts of xylene and 10 parts of titanium tetrachloride are heated to 120° C. and mixed with 100 parts of crepe. The solvent is distilled off from the homogeneous solution with steam until a kneadable mass results, which is washed on a roller, first with soda solution and then with water.

*Example 3*

100 parts of crepe are added to a mixture of 150 parts of xylene and 30 parts of concentrated sulfuric acid, heated to 125° C. The temperature is then raised to 130–140° C. After 2 hours the mixture is diluted with 100 parts of tetrahydrofuran and precipitated by methanol.

*Example 4*

100 parts of crepe, 200 parts of xylene and 25 parts of boron fluoride-phenol are mixed and heated rapidly to 130° C. The solution is precipitated in hot methanol and the precipitate washed. The reaction product is well compatible with linseed oil, alkyd resins and other lacquer or varnish base materials.

*Example 5*

100 parts of crepe are placed in a reaction vessel heated to 100° C. and mixed with 150 parts of gasoline (B.P. 100° C.) and 22 parts of boron fluoride-phenol. The mixture is isomerized at 130–140° C. until a homogeneous solution results. After cooling the solution to a temperature below 100° C., finely pulverized soda lime wetted with solvents or anhydrous soda is added with stirring. After filtering the solution can be used in the manufacture of varnishes or lacquers.

*Example 6*

150 parts of the tetrachloroethane are heated to 120° C. and reacted with 10 parts of mixture of boron fluoride-acetic acid and 100 parts of crepe. The reaction temperature is raised to 135° C. The isomerization product obtained is isolated by precipitation with a mixture of acetone and alcohol.

*Example 7*

300 parts by volume of tetrachloroethane and 50 parts of phenol are heated to 120° C. 10 parts of concentrated sulfuric acid and 100 parts of crepe are added. The mixture is capable of being stirred after a few minutes and is stirred at 120° C. for one hour. By intensely stirring or shaking the homogeneous solution with a soda solution (5%) an emulsion results. The isomerization product is isolated from the emulsion by distilling off the solvent and the phenol with steam. The dried product is well soluble in aliphatic hydrocarbons and drying oils, gives hard films and can be used in the manufacture of oil-modified varnishes or lacquers.

We claim:

1. Process for the isomerization of non-vulcanized rubber which comprises mixing about 0.3 to 1.0 part by weight of solid non-vulcanized rubber with 1 part by weight of a rubber solvent and about 10–30% by weight, based on the weight of rubber, of an acid isomerizing agent, and subjecting the mixture to a temperature ranging from about 90° C. to about 140° C., whereby isomerization of the rubber and dissolution of the isomerized rubber occurs.

2. Process of claim 1 wherein the isomerization is carried through in the presence of a phenol, the amount of the latter being less than that of the rubber.

3. Process of claim 1 wherein the solid non-vulcanized rubber is crepe rubber, and the solvent is an aromatic hydrocarbon.

4. Process of claim 1 wherein the solid non-vulcanized rubber is crepe rubber, and the solvent is an aliphatic hydrocarbon.

References Cited in the file of this patent

UNITED STATES PATENTS

| 1,797,188 | Bruson | Mar. 17, 1931 |

FOREIGN PATENTS

| 307,134 | Great Britain | Mar. 7, 1929 |
| 320,427 | Great Britain | Oct. 17, 1929 |
| 451,595 | Great Britain | Aug. 6, 1936 |
| 102,933 | Australia | July 11, 1936 |